United States Patent [19]

Carroll

[11] Patent Number: 5,555,490
[45] Date of Patent: Sep. 10, 1996

[54] WEARABLE PERSONAL COMPUTER SYSTEM

[75] Inventor: David W. Carroll, Northfield, Minn.

[73] Assignee: Key Idea Development, L.L.C., Northfield, Minn.

[21] Appl. No.: 166,222

[22] Filed: Dec. 13, 1993

[51] Int. Cl.$^6$ .................................. G06F 1/16; H05K 7/10
[52] U.S. Cl. .............................. 361/686; 361/683; 2/905
[58] Field of Search ...................... 364/708.1; 345/169;
439/37, 135, 149, 519, 521–523, 527, 529, 577, 894; 2/2.11, 2.14, 69.5, 102, 905, 906; 362/103, 105, 106; 361/680, 684, 686

[56] References Cited

U.S. PATENT DOCUMENTS

| | | |
|---|---|---|
| 2,156,504 | 5/1939 | Liss . |
| 3,588,359 | 6/1971 | Gribb . |
| 3,744,025 | 7/1973 | Bilgutay . |
| 3,876,863 | 4/1975 | Boone . |
| 3,956,740 | 5/1976 | Jones et al. . |
| 4,087,864 | 5/1978 | LeBove et al. . |
| 4,096,577 | 6/1978 | Ferber et al. . |
| 4,104,728 | 8/1978 | Kasubuchi . |
| 4,364,112 | 12/1982 | Onodera et al. . |
| 4,545,023 | 10/1985 | Mizzi ................................ 361/680 X |
| 4,607,156 | 8/1986 | Koppenaal et al. . |
| 4,633,881 | 1/1987 | Moore et al. . |
| 4,690,653 | 9/1987 | Goldberg ............................. 2/173 X |
| 4,719,462 | 1/1988 | Hawkins . |
| 4,756,940 | 7/1988 | Payne et al. . |
| 4,825,471 | 5/1989 | Jennings . |
| 4,827,534 | 5/1989 | Haugen .................................. 2/108 |
| 4,845,650 | 7/1989 | Meade et al. . |
| 4,882,685 | 11/1989 | Van Der Lely . |
| 4,899,039 | 2/1990 | Taylor et al. . |
| 4,916,441 | 4/1990 | Gombrich . |
| 5,003,300 | 3/1991 | Wells . |
| 5,007,427 | 4/1991 | Suzuki et al. . |
| 5,024,360 | 6/1991 | Rodriquez . |
| 5,029,260 | 7/1991 | Rollason . |
| 5,035,242 | 7/1991 | Franklin et al. . |
| 5,067,907 | 11/1991 | Shotey . |
| 5,078,134 | 1/1992 | Heilman et al. . |
| 5,105,067 | 4/1992 | Brekkestran et al. . |
| 5,144,120 | 9/1992 | Krichever et al. . |
| 5,158,039 | 10/1992 | Clark . |
| 5,208,449 | 5/1993 | Eastman et al. . |
| 5,267,181 | 11/1993 | George . |

(List continued on next page.)

FOREIGN PATENT DOCUMENTS

| | | |
|---|---|---|
| 0264956 | 4/1988 | European Pat. Off. . |
| 1887091 | 3/1975 | United Kingdom . |

OTHER PUBLICATIONS

Leslie Helm; Japan Turns Fanciful in the Evolution of Computers; Los Angeles Times; Oct. 14, 1991; Business Section; p. 1; Part D, Col. 2.

"Computers of the '90s: A Brave New World"; Newsweek, Oct. 24, 1988; pp. 52–54.

Optical Memory News; Apr. 1991, Issue 94; pp. 1 and 18.

Primary Examiner—Michael W. Phillips
Attorney, Agent, or Firm—Patterson & Keough, P.A.

[57] ABSTRACT

A wearable support and interconnection structure for a modular microcomputer system having a plurality of microcomputer cards housed in a plurality of microcomputer card pockets linked by flexible circuitry and card connectors within a wearable garment. The support and interconnection structure includes a plurality of channels defined in the garment that secure an electronic linking system to the wearable garment. The linking system includes a plurality of flat flexible cables encasing flexible circuitry and operably connected to a plurality of microcomputer card connectors opening into each pocket. The linking system extends from pocket to pocket in a predetermined sequence. The support and interconnection structure operably couples microcomputer cards, including at least a processor card (and power supply), a device card and one or more special function cards, such as, for example, PCMCIA cards, such that, when provided with power, an operational microcomputer system is created.

20 Claims, 5 Drawing Sheets

U.S. PATENT DOCUMENTS

| | | |
|---|---|---|
| 5,272,324 | 12/1993 | Blevins . |
| 5,278,730 | 1/1994 | Kikinis ................................ 361/686 |
| 5,285,398 | 2/1994 | Janik .................................. 364/708.1 |
| 5,305,181 | 4/1994 | Schultz . |
| 5,305,244 | 4/1994 | Newman et al. . |
| 5,329,106 | 7/1994 | Hone et al. . |
| 5,416,310 | 5/1995 | Little .................................. 235/462 |
| 5,416,730 | 5/1995 | Lookofsky ........................ 364/708.1 |
| 5,450,596 | 9/1995 | Felsenstein .................. 364/708.1 X |

WEARABLE PERSONAL COMPUTER SYSTEM

BACKGROUND OF THE INVENTION

1. Field of the Invention

The present invention broadly relates to a portable microcomputer system. More specifically, the present invention relates to a wearable support and interconnection structure for a modular microcomputer system.

2. Description of Related Art

Over time, computers have become faster, smaller and more efficient. As computers have been reduced in size, so too have their housing requirements been reduced. Computer power that once required special environmentally controlled rooms can now be found in desktop, laptop and even notebook computers that are not much larger than a rather thick 8½×11" paper tablet.

The recent adoption of the Personal Computer Memory Card International Association (PCMCIA) standard in the computer industry with the corresponding development of central processing units embodied in a small card-size package has further reduced the physical space required by a microcomputer system to an even smaller footprint. Under the PCMCIA or equivalent standard, the equivalent functionality of desktop and laptop computers can now be found in a set of card-size devices, each measuring no more than 6"×2.12"×10 mm. The exact dimensions of each card depends on the PCMCIA or equivalent release specifications to which the device conforms, for example, Type I, Type II or Type III PCMCIA cards. Being of such a small size, the PCMCIA cards, or PC cards as they are more generically known, are highly portable, having been designed to be carried individually in a shirt pocket, for example, just like a floppy diskette.

The primary use for PCMCIA cards has been to increase the functionality of notebook computers, such as the Hewlett Packard OmniBook 300. In this type of notebook computer, a number of PCMCIA slots are available along the periphery of the notebook computer housing. When a user plugs a PCMCIA card into one of the PCMCIA slots to expand the memory functionality, for example, of the notebook computer, the PCMCIA card extends outward from the periphery of the housing of the notebook computer. Unfortunately, this increases the overall footprint of the notebook computer roughly by the size of the PCMCIA cards, thereby making the notebook computer less portable.

An alternate configuration is the stacking of the PCMCIA cards along a vertical axis with a vertically-oriented rigid backplane-type connector to interconnect the various PCMCIA cards. The footprint here becomes the size of a single PCMCIA card while the height is dependent on the number of PCMCIA cards in the stack. This configuration, however, creates a box-like shape that is awkward to carry and is no longer possible to place in one's pocket.

Many work environments require an operator to do several tasks at once and, in those situations, requiring an operator to hold a computer in their hands would be a hindrance. While it is possible to carry a portable notebook computer, there is often not the space needed to set a notebook computer on in order to operate the notebook computer. Consequently, there is a need for a portable computer system that could be carried, and even operated, without requiring the use of an operator's hands and without requiring a desk space, for example, on which to locate the computer.

One example for such a need is a physician making the rounds of his or her patients. Typically, there is not the space to set up a readily accessible notebook computer and the physician may need to use his or her hands to perform an accurate diagnosis of the patient's condition. In addition, it may be helpful for the physician to have immediate access to all of the patient's current medical charts, various disease or drug reference materials, treatment and operating room schedules and the patient's past medical history. Typically, such diverse information might be stored on a number of different floppy diskettes or PCMCIA cards, requiring the physician to manually carry and switch these devices in order to access different information. The physician may also want to leave a message for a specialist to examine the patient or to make changes to the treatment or consult with other medical support staff. Ideally, integration of computers and telecommunications in a hands-free wearable housing could allow a physician to perform all these tasks as the physician moves from bedside to bedside.

As another example, it would be helpful in a fast food restaurant for an employee to use a portable microcomputer system to receive and enter orders, while filling prior orders. At the same time, if the employee had any questions about a current order, it would be helpful if he or she could automatically access instructional manuals or query to other employees without leaving his or her station. In addition, if the employee had access to a communications capable microcomputer system, the employee could alert the other employees in the store immediately to any problems or anticipated delays, even if the employee to be notified was not readily available. With ready access to a computer system for transmitting and storing information, these tasks could be routine. In a fast food restaurant environment, however, much of the food preparation is done by hand and requiring an employee to hold a computer system would be counter-productive.

A personal microcomputer system support and interconnection structure that provides for portable, hands-free operation of the microcomputer system, and that is adaptable for user-defined modular configuration of each modular component of the microcomputer system, would be greatly appreciated.

SUMMARY OF THE INVENTION

Embodiments according to the invention relate to a wearable support and interconnection structure for a modular microcomputer system having a plurality of microcomputer cards housed in a plurality of microcomputer card pockets in a wearable garment. According to one embodiment, the pockets are linked by a plurality of channels extending from pocket to pocket in a predetermined pattern. The channels secure an electronic linking system to the wearable garment. The linking system includes a plurality of flat flexible cables encasing flexible circuitry and microcomputer card connectors. A card connector opens into each pocket to receive a microcomputer card. Each connector is operably coupled to the cables such that when microcomputer cards, that is, PC cards including a processor card, a device card and one or more special function cards, such as, for example, PCMCIA cards, are placed in the connectors and provided with power, an operational microcomputer system is created.

The garment structure provides a portable, lightweight housing that is easily foldable into a variety of shapes. The modular structure of the card pockets and linking system allows ready changes in the configuration of the microcomputer system by the user.

Use of the present invention with a earphone/microphone input/output device in a spread spectrum, wireless network environment allows hands-free operation as well as ease of use of the microcomputer system.

DETAILED DESCRIPTION OF PREFERRED EMBODIMENTS

Figure 1:
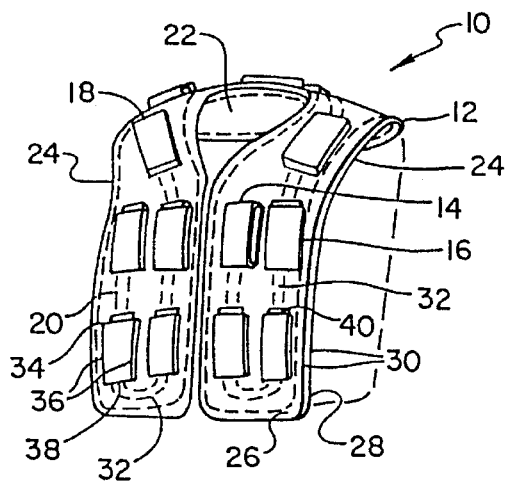
FIG. 1 is a front view of a microcomputer body conformable support structure in accordance with a first embodiment of the present invention.

Reference is now made to the drawings wherein like reference numerals denote like elements throughout the several views.

A microcomputer support and interconnection structure 10 in accordance with the present invention broadly includes a pliable garment 12, a plurality of microcomputer card pockets or enclosures 14, 16, 18, arranged in a predetermined pattern and a linking or signal transmission system 20. The garment 12 and the pockets 14, 16, 18 may be constructed of the same type of cloth or other pliable material or may be composed of different types of body conforming, pliable material such as are commonly used in the manufacture of garments.

Referring to FIG. 1, the pliable garment 12 includes a neck opening 22, opposed arm openings 24, a front face 26 and a back face 28. The garment 12 is composed of one or more layers 30 including structure defining a plurality of channels 32. The neck opening 22 is of sufficient size to fit easily over a user's head. The arm openings 24 permit easy passage of the user's arms through the arm openings 24.

The channels 32 extend between and into each of the pockets 14, 16, 18 in a predetermined sequence. The channels 32 present a characteristic width of sufficient size to encase a flat flexible substrate, such as ribbon cable common in the computer industry. The sequence of the channels 32 is dependent on the functional configuration of the microcomputer system chosen by the user. It will be understood that the channels 32 may be defined by a plurality of layers 30 or may be defined by a plurality of securing loops. The securing loops, for example, are made by securing string or thread to mesh or net fabric.

Referring to FIGS. 1–4, the card pockets 14, 16, 18 include structure defining a pocket opening 34, opposed side margins 36, and a bottom edge 38. The garment 12, opposed side margins 36 and bottom edge 38 define a card-receiving cavity 40. The card-receiving cavity 40 is of sufficient size to hold a PC card, such as a PCMCIA card or processing card, for example.

For card pockets 16, 18, the opposed side margins 36 are permanently affixed to the garment 12 and the bottom edge 38 is permanently affixed to the garment 12 along only a portion of the bottom edge 38. The bottom edge 38 is not affixed to the garment 12 along the portion of the bottom edge 38 adjacent to the channel 32. For card pocket 14, the bottom edge 38 is permanently affixed to the garment 12 and one of the side margins 36 is affixed to the garment 12 along only a portion of the side margin 36. The portion of the side margin 36 which is not affixed is that portion adjacent to a channel 32.

Figure 4:
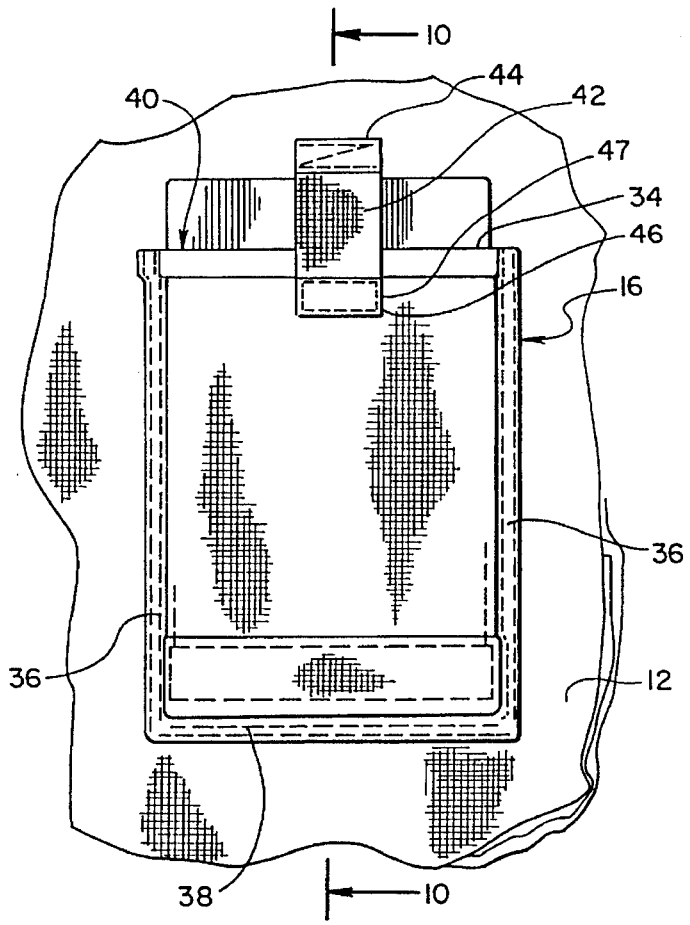
FIG. 4 is a partial front view of a card pocket.
Figure 5:
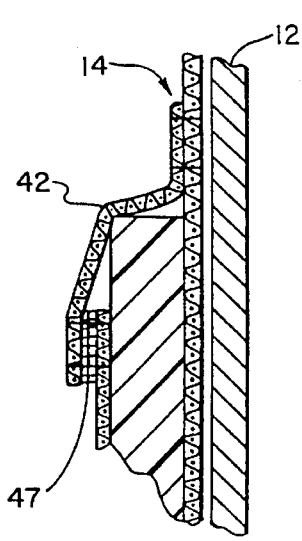
FIG. 5 is a partial sectional view of a card pocket taken from the perspective of line 10—10 of FIG. 4.
Figure 6:
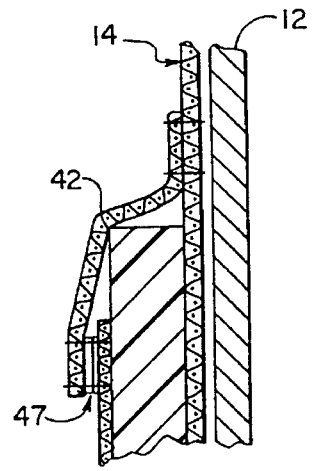
FIG. 6 is an alternate embodiment of a card pocket taken from the same perspective as in FIG. 5.
Figure 7:
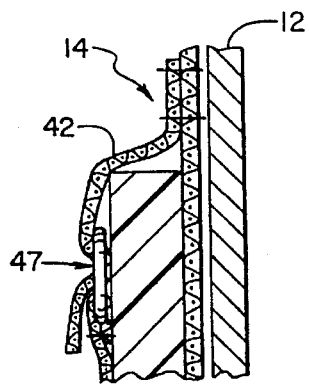
FIG. 7 is an alternate embodiment of a card pocket taken from the same perspective as in FIG. 5.
Figure 8:
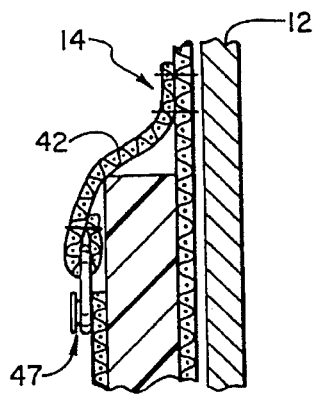
FIG. 8 is an alternate embodiment of a card pocket taken from the same perspective as FIG. 5.
Figure 9:
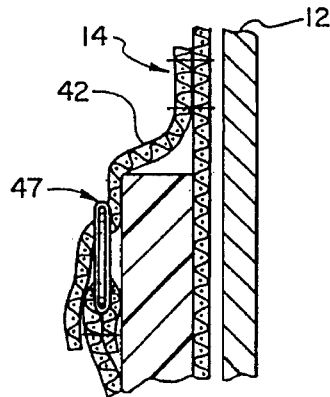
FIG. 9 is an alternate embodiment of a card pocket taken from the same perspective as in FIG. 5.

Referring to FIG. 4, the card pockets 14, 16, 18 may include a securing member 42. The securing member 42 presents an upper edge 44 and a lower edge 46 and is generally rectangular in shape. In this embodiment, the upper edge 44 of securing member 42 is permanently affixed to garment 12 such that the securing member 42 is positioned equidistant from the opposed side margins 36 of the card pockets 14, 16, 18 and above the pocket opening 34. The lower edge 46 is detachably attached to the card pocket 14, 16, 18 such that when the lower edge 46 of the securing member 42 is attached to the card pocket 14 the securing member extends from the garment 12 over the card pocket opening 34 and to the card pocket 14.

Figure 10:
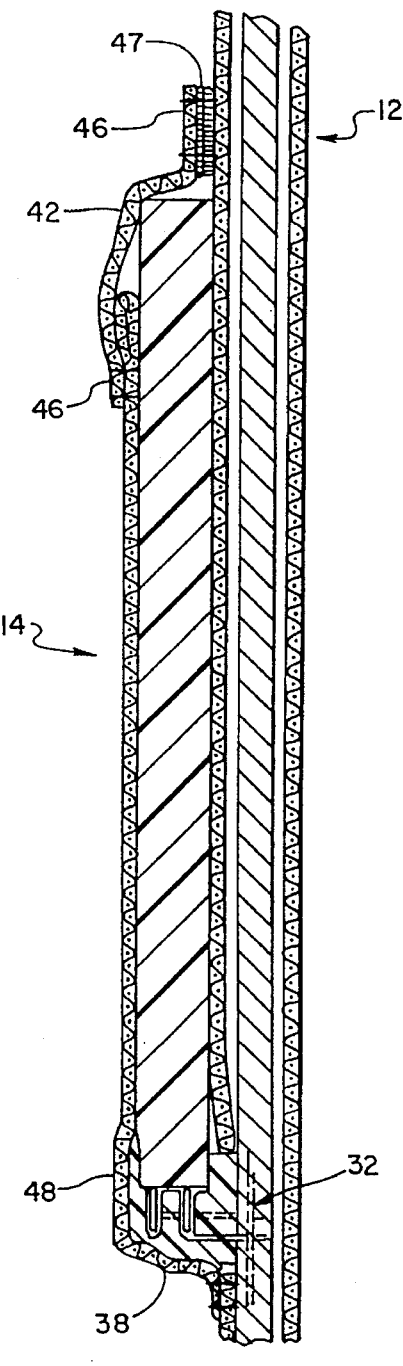
FIG. 10 is a full sectional view of the card pocket taken along line 10—10 of FIG. 4.
Figure 11:
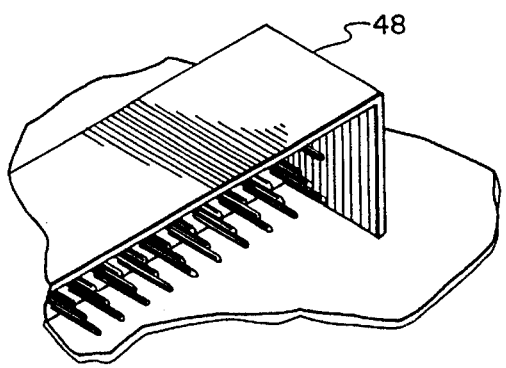
FIG. 11 is a partial perspective view of a connector.
Figure 12:
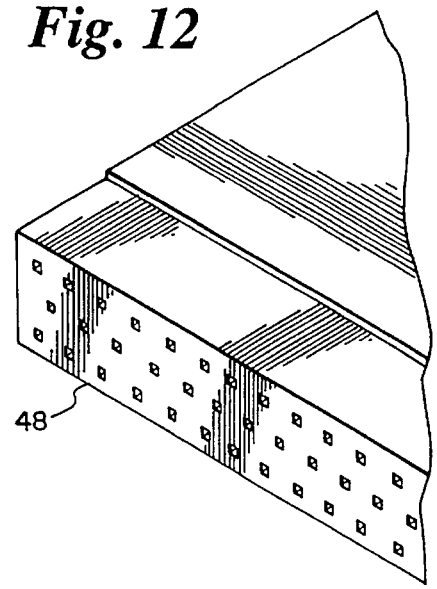
FIG. 12 is an alternate embodiment of a connector.
Figure 13:
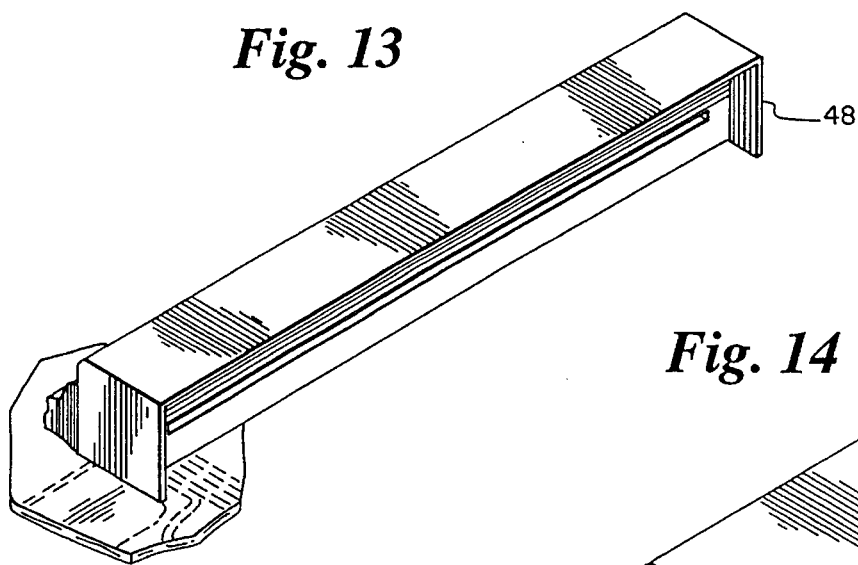
FIG. 13 is an alternate embodiment of a connector.
Figure 14:
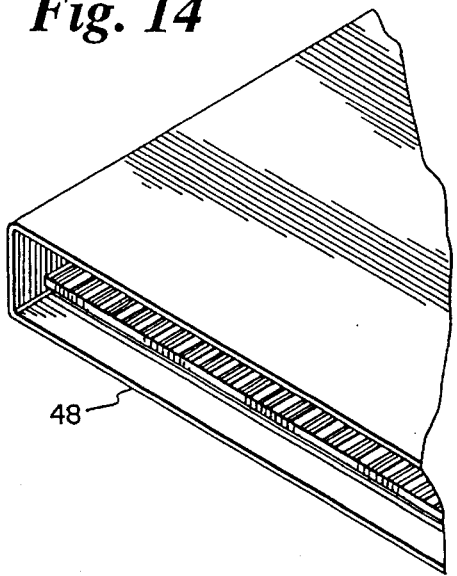
FIG. 14 is an alternate embodiment of a connector.

It will be understood that the securing member may be detachably attached to the card pocket 14 by numerous attachment mechanisms 47, such as, for example, referring to FIGS. 5–9, a hook and loop closure mechanism, a snap fastener, a buckle mechanism, a loop and button mechanism, or a clip buckle mechanism. It will also be understood that, as shown in FIG. 10, the lower edge 46 of the securing member 42 may be permanently fixed to the card pocket 14 while the upper edge 44 is detachably attached to the garment 12.

Figure 3:
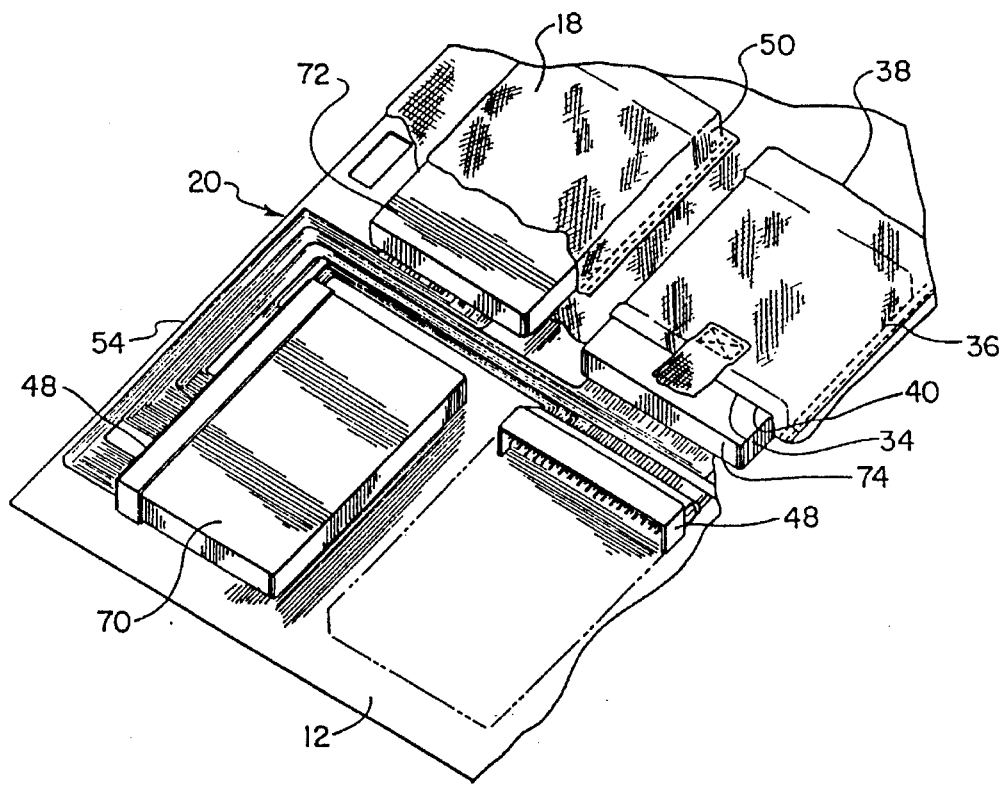
FIG. 3 is a cutaway perspective view of a microcomputer system housed in support structure in accordance with the first embodiment of the present invention.

Referring to FIGS. 1 and 3, the linking system 20 (shown in phantom lines in FIG. 1) includes a plurality of PC card or other device connectors 48 and power connectors 50 operably engaged to a flat flexible cable 54 in a predetermined sequence. Each of the connectors is are operably secured within the card-receiving cavity 40 of each card pocket 14, 16, 18 adjacent to each channel 32 such that the mating portion of the connector 48, 50 extends into the card-receiving cavity 40. The flexible cable 54 extends from each connector 48 through the channel 32 to the next connector 50. The flexible cable 54 is ribbon or MYLAR® cable typical in the computer industry which provides flexible circuitry encased in a flat flexible substrate. The sequence of the connectors 48, 50 along the flexible cable 54 is determined by the desired functionality of the microcomputer system. It will be understood that a variety of connectors are possible, such as, for example, referring to FIGS. 11–14, a 236 pin or 88 pin card male or female connector, a flat slot male or female connector or other device connectors common in the electronic industry.

It will also be understood that, for operation of the present invention 10 in a spread spectrum, wireless network, an antenna structure may be incorporated into the circuitry 54 of the linking system 20, or, alternately, the antenna may extend from a connector 48, 50 or a functional component 70, 72, 74.

Figure 2:
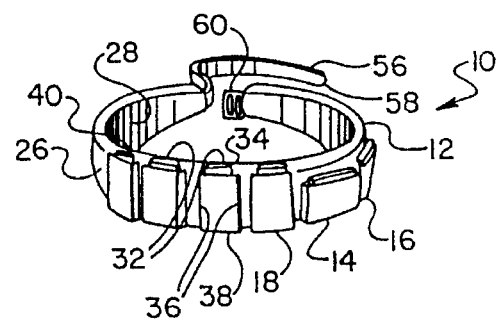
FIG. 2 is a perspective view of a first alternate embodiment of the present invention.
Figure 15:
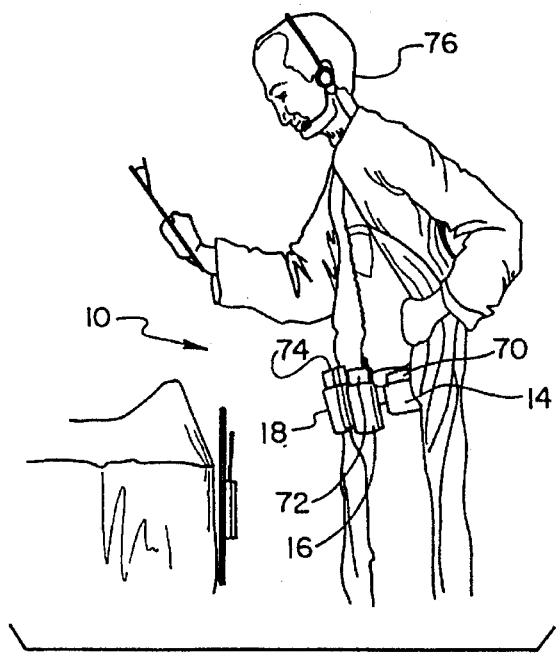
FIG. 15 is a perspective view of the first alternate embodiment of the present invention as worn by a user.

Referring to FIGS. 2 and 15, in a first alternate embodiment of the present invention, garment 12 is a wearable support member in the form of a belt, composed of a long, generally rectangular shaped material presenting opposed ends 56, 58. In this embodiment, card pockets or enclosures 14, 16, 18 are oriented parallel or perpendicular to each other along the garment 12 at regular intervals. The garment 12 includes a fastening system 60 attached to its opposed ends 56, 58. The fastening system 60, may be a belt buckle and mating holes, a loop and hook closure system, a hook and eye system enclosure, mating snaps, ties or clip buckles, such as those commonly used on backpacks. It will be understood that the fastening system 60 may be any type of system that holds the garment 12 securely to a user's waist or torso.

Figure 16:
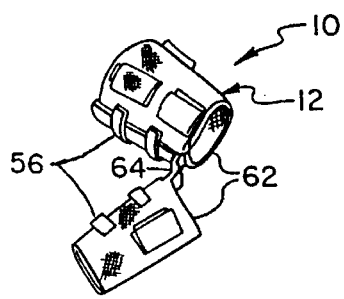
FIG. 16 is a second alternate embodiment of the present invention designed for wearing on an arm.

Referring to FIG. 16, in a second alternate embodiment of the present invention, garment 12 for the support structure 10 is composed of two generally rectangular bands of material 62 and a joint piece 64 and a fastening system 56. The joint piece 64 attaches a portion of each of bands 62 to each other such that the bands 62 may rotate from 0–270 degrees from each other.

Figure 17:
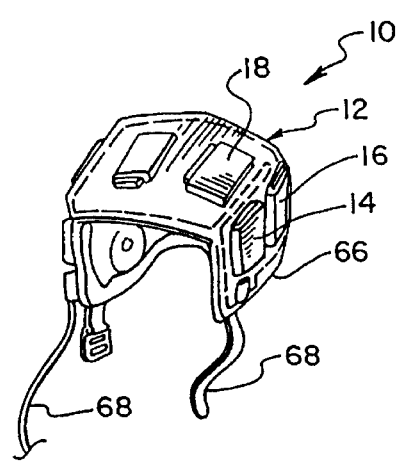
FIG. 17 is a third alternate embodiment of the present invention designed for wearing on a user's head; and, FIG. 18 is a perspective view of the first embodiment of the present invention of FIG. 1 as worn by a user.

Referring to FIG. 17, in a third alternate embodiment of the present invention, garment 12 for the support structure 10 is composed of a cap 66 and cap fasteners 68. The cap 66 is of sufficient size to fit snugly on a user's head without obscuring the user's view. The cap fasteners 68 are attached to the cap and detachably secure the cap to the user's head. The cap fasteners 68 may be, for example, ties or clip buckles or mating snaps or a hook and loop closure system.

Figure 18:
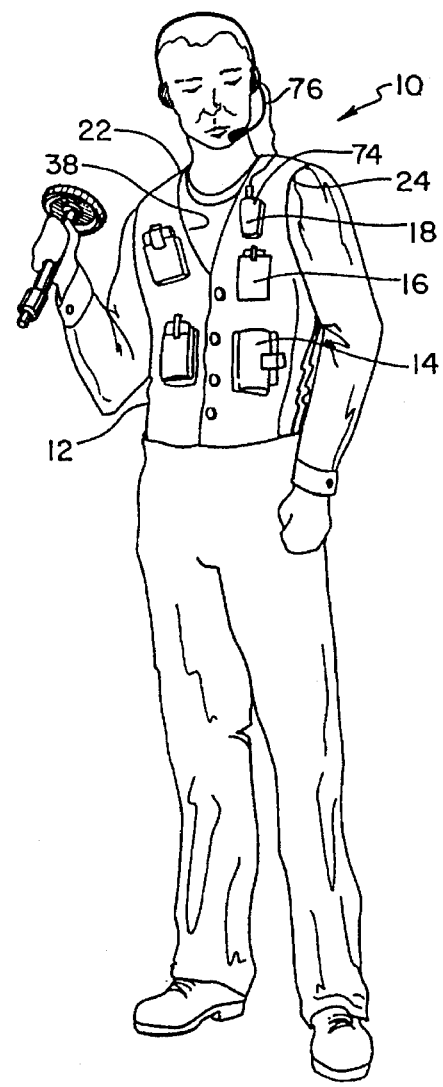

In operation, referring to FIGS. 15 and 18, the user inserts the functional components 70, 72, 74, such as PC cards of the desired microcomputer system into the card pockets 14, 16, 18 and into the appropriate PC card or other device connector 48 and power connector 50. The user then dons the support structure 10 and connects the desired input/output device 76 to the appropriate component(s) 72, 74. It will be understood by those skilled in the art that data input and output may occur through a number of different input and output devices 76, including a keyboard, mouse, microphone/earphone apparatus, touchscreen monitor or bar code scanner. It will also be understood that some devices 76 may be accessible through use of an infrared connection, such as, for example, printers or other computers within a network.

The linking system 20 electronically connects each of the functional components 70, 72, 74 to each other. Once the user activates the power, the microcomputer system is operational and the support structure 10 will follow the movements of the user.

Through the use of a microphone/earphone input/output device, the user may operate the computer system hands-free. The microphone/earphone device may be connected directly to a special function card through a port provided. One example of a communication port for a communication card is that disclosed in U.S. Pat. No. 5,183,404 to Aldous et al., issued Feb. 2, 1993 and assigned to Megahertz Corporation. In operation, for example, the user may hear audio signals through the earphone, such as, for example "Messages waiting" and reply into the microphone by speaking a short key phrase, such as, for example, "Play messages" or "Play first message."

More specifically, for example, referring to FIG. 18, in donning the support structure 10, the user places their neck in the neck opening 22 and their arms in the arm openings 24 such that back face 28 of the garment 12 rests on the user's chest. Referring to FIG. 15, the user secures the support structure 10 around his waist with the fastening system 56.

The input/output device 76 illustrated in FIG. 15 is a headset holding a microphone/earphone combination which the user places on the head in an appropriate position. The earphone/microphone combination is operably connected to a component 74 having voice recognition capabilities and transmitter capabilities such as RF radio transmission capabilities. An example of such a component 74 is the E.S.P. Voice Recognition & Synthesis Module distributed by Dovatron International, Inc. of Longmont, Colo.

It will be understood by those skilled in the art that a wide range of functionality is possible in choosing the microcomputer system components 70, 72, 74 to place in the card pockets 14, 16, 18. In one embodiment, the components 70, 72, 74 may include a microcomputer processor card and power supply, a device controller card and one or more special function cards. In this embodiment, the preferred sequence of the channels 32 would be from the card pocket 14 with a microcomputer processor connector 50, to the card pocket 16 with a device connector 48 and from the device connector 48 to each of the card pockets 18 with a special function card connector 52. Following this sequence, the microcomputer processor card and power supply 70, would be linked to the device controller card 72 and the device controller card 72 would be linked to each of the special function cards 74 through the linking system 20.

A microcomputer processor card, such as, for example, an Epson Card SCE86325 series marketed by Seiko Epson Corporation of Japan, includes at least 1 MB RAM, 128 K ROM, FDC and keyboard controller, VGA controller, one or more serial and parallel port controllers and the functionality of an IBM PC AT microcomputer accessible via a single 236 pin card connector. The Epson Card presents a characteristic length of no more than 86 mm, a characteristic width of no more than 55 mm and a characteristic height of no more than 6 mm. The portable, removable and/or rechargeable power supply is operably coupled to the microcomputer processor card. The power supply presents a characteristic length and width no greater than that of the microcomputer processor card. It will be understood that the power supply may also be contained in its own case and placed in a separate card pocket 14, 16, 18 than the microprocessor card component 70.

The device controller card may be, for example, an E.S.P. PCMCIA Module offered by Dovatron International, Inc of Longmont, Colo. which supports Type 1, 2, or 3 PCMCIA devices and presents dimensions of 1.7"×5.2".

Special function cards may, for example, include PCMCIA cards which provide additional nonvolatile memory, miniature permanent data storage, LAN adapters or fax/modems. Dovatron International, Inc. of Longmont, Colo.

advertises an E.S.P. Ethernet Module for providing access to a local area network (LAN) which presents dimension of 1.7"×5.2". The E.S.P. Bar Code Module distributed by Dovatron International, Inc. of Longmont, Colo. offers data input via a bar code scanner. Interaction with peripherals, such as printers or touchscreens remote from the user, is possible by including a special function card that uses infrared light transmission for communication such as, for example, the card used in the NEWTON handheld computer manufactured by Apple Computer of Cupertino, Calif.

It will be understood by those skilled in the art that other microcomputer components for memory, processors, controllers and special function devices may be used, depending on user-determined overall functionality of the microcomputer system.

To use the computer system, the user activates the power and initiates the desired computer function via the input/output device 76. The components 70, 72, 74 are stored and supported by the structure of card pockets 14, 16, 18 and garment 12 in combination with the appropriate connector 48, 50, 52 and any securing member 42. The card pockets 14, 16, 18 are easily accessible to accommodate changes in the components 74 should replacement or upgrades be necessary.

The support and interconnection structure 10 is composed of cloth, leather or other body conformable pliant material and so provides a low cost, lightweight housing for each system. The support and interconnection structure 10 provides a very flexible microcomputer system housing that may be easily folded and attached to the user's body for use in a variety of environments.

In addition, the support and interconnection structure 10 is easily cleaned by conventional methods. When support structure 10 requires cleaning, the user can readily remove the components 74. The user then places a mating connector, such as, for example, those shown in FIGS. 11–14, in each of the exposed connectors 48, 50, 52. The support and interconnection structure 10 may be washed and air-dried by conventional methods without harm to the circuitry encased.

Numerous characteristics and advantages of the invention have been set forth in the foregoing description. It will be understood, of course, that this disclosure is, in many respects, only illustrative. Changes can be made in details, particularly in matters of shape, size and arrangement of parts without exceeding the scope of the invention. The invention's scope is defined in the language in which the appended claims are expressed.

What is claimed is:

1. A wearable electronic computing device designed for hands-free input operations by a wearer of the computing device, the computing device comprising:

a wearable support member in the form of a belt, the wearable support member comprising pliant material comfortable to and supportable by the body of the wearer of the computing device;

a processor supported by the wearable support member to perform computer processing functions;

a plurality of PC card connectors supported by the wearable support member, the PC card connectors being shaped to collectively mateably receive a plurality of PC cards, the wearable support member providing flexibility and relative movement between the processor and the PC card connectors to be conformable to the body of the wearer;

a plurality of PC cards slidably received within and mateably secured to the PC card connectors to form a computing configuration for performing at least one desired computing function, the PC cards further being readily insertable into and removable from the PC card connectors to perform different computing functions;

a signal transmission system coupled with and interconnecting the processor and the PC card connectors to transmit signals between the processor and the PC cards, the signal transmission system being supported by the wearable support member;

an input device operably coupled with at least one of the processor and the plurality of PC cards, the input device being supportable by the body the wearer to receive audible, verbal input from the wearer of the computing device such that the wearer can perform input operations in a hands-free manner, the input device generating signals corresponding to the audible input for transmission to the processor;

an output device operably coupled with at least one of the processor and the plurality of PC cards, the output device being supportable by the body of the wearer to generate output perceivable to the wearer of the computing device, the output device generating the output in response to signals received from the processor; and a plurality of enclosures supported by the wearable support member, at least one of the PC card connectors being disposed within each of the plurality of enclosures.

2. The computing device of claim 1, wherein the output device is constructed to generate verbal output that is audible to the wearer.

3. The computing device of claim 1, wherein the input device comprises a microphone supportable by the body of the wearer of the computing device.

4. The computing device of claim 1, wherein the signal transmission system comprises a wireless system for transmitting signals between the processor and the PC card connectors.

5. The computing device of claim 1, wherein the signal transmission system comprises an infrared transmission system.

6. The computing device of claim 1, wherein the signal transmission system comprises an antenna operably coupled with at least one of the PC card connectors.

7. The computing device of claim 1, wherein the signal transmission system comprises a flat flexible cable.

8. The computing device of claim 1, further comprising plugs for insertion into the PC card connectors when the PC cards are removed from the PC card connectors, to allow the wearable support member to be washed.

9. The computing device of claim 1, wherein the processor comprises a substantially flat, substantially rectangular PC processor card, the computing device further comprising a processor card connector supported by the wearable support member, the processor card being readily insertable into and removable from the processor card connector.

10. The computing device of claim 1, wherein the enclosures comprise a plurality of pockets, each of the PC card connectors being enclosed within a respective one of the pockets to receive and enclose a respective PC card.

11. The computing device of claim 10, wherein at least one of the pockets is oriented perpendicularly to at least one other of the pockets.

12. The computing device of claim 1, wherein the input device and output device are constructed to be used in a wireless network.

13. The computing device of claim 12, wherein the signal transmission system comprises an antenna for communicating in the wireless network.

14. The computing device of claim 1, wherein the input device and the output device together comprise a microphone/earphone combination supportable by a head of the wearer.

15. The computing device of claim 1, wherein the output PC card comprises a LAN adapter card.

16. The computing device of claim 1, wherein the output PC card comprises a fax/modem card.

17. The computing device of claim 1, wherein at least one of the PC cards is an input PC card and at least one other of the PC cards is an output PC card; further wherein the input device is operably coupled with the input PC card and the output device is operably coupled with the output PC card, the input and output signals being transmitted to and from the processor via the signal transmission system.

18. A wearable electronic computing device designed for hands-free input operations by a wearer of the computing device, the computing device comprising:

wearable support means for forming a belt, the wearable support means comprising pliant material conformable to and supportable by the body of the wearer of the computing device;

processor means supported by the wearable support means for performing computer processing functions;

PC card connector means supported by the wearable support means for mateably receiving a plurality of PC cards, the wearable support means providing flexibility and relative movement between the processor means and the PC card connector means to be conformable to the body of the wearer;

PC card means slidably received within and mateably secured to the PC card connector means for forming a computing configuration for performing at least one desired computing function, the PC card means further being readily insertable into and removable from the PC card connector means to perform different computing functions, the PC card means comprising at least one input PC card and at least one output PC card;

signal transmission means coupled with and interconnecting the processor means and the PC card connector means for transmitting signals between the processor means and the PC card means, the signal transmission means being supported by the wearable support means;

input means operably coupled with at least one of the processor means and the PC card means, the input means being supportable by the body of the wearer of the computing device for receiving audible, verbal input from the wearer of the computing device such that tile wearer can perform input operations in a hands-free manner, the input means generating signals corresponding to the audible input for transmission to the processor means via the signal transmission means;

output means operably coupled with at least one of the processor means and the PC card means, the output means being supportable by the body of the wearer for generating output perceivable to the wearer of the computing device, the output means generating the output in response to signals received from the processor means via the signal transmission means; and a plurality of enclosures supported by the wearable support means, the PC card connector means being disposed within the plurality of enclosures.

19. The computing device of claim 18, wherein the input means and output means are constructed to be used in a wireless network.

20. The computing device of claim 18, wherein the input means and the output means together comprise a microphone/earphone combination supportable by a head of the wearer.

* * * * *